United States Patent
Hertz

(10) Patent No.: US 10,208,532 B2
(45) Date of Patent: Feb. 19, 2019

(54) THERMALLY INSULATING CURTAIN

(71) Applicant: Peter Hertz, Vänersnäs (SE)

(72) Inventor: Peter Hertz, Vänersnäs (SE)

( * ) Notice: Subject to any disclaimer, the term of this patent is extended or adjusted under 35 U.S.C. 154(b) by 0 days.

(21) Appl. No.: 14/905,796

(22) PCT Filed: Jul. 8, 2014

(86) PCT No.: PCT/SE2014/050875
§ 371 (c)(1),
(2) Date: Jan. 16, 2016

(87) PCT Pub. No.: WO2015/009230
PCT Pub. Date: Jan. 22, 2015

(65) Prior Publication Data
US 2016/0153228 A1 Jun. 2, 2016

(30) Foreign Application Priority Data

Jul. 16, 2013 (SE) ...................................... 1350885

(51) Int. Cl.
*E06B 9/24* (2006.01)
*E06B 9/40* (2006.01)
(Continued)

(52) U.S. Cl.
CPC ............... *E06B 9/24* (2013.01); *B60J 1/2011* (2013.01); *B60J 1/2041* (2013.01); *E06B 9/40* (2013.01);
(Continued)

(58) Field of Classification Search
CPC ............... E06B 9/24; E06B 2009/2423; E06B 2009/2447; E06B 9/40; E06B 9/582; E06B 2009/17069; F24J 2/0444; F24J 2002/502
(Continued)

(56) References Cited

U.S. PATENT DOCUMENTS 2,407,590 A * 9/1946 Vineberg ....................... 110/191
2,484,127 A * 10/1949 Stelzer ................ F24D 11/007
126/585
(Continued)

FOREIGN PATENT DOCUMENTS

DE 2702214 A 7/1978
DE 3928259 A1 * 2/1991 ............... E06B 7/02
(Continued)

OTHER PUBLICATIONS

Swedish Patent and Registration Office, Int'l Search Report in PCT/SE2014/050875, dated Nov. 7, 2014.

*Primary Examiner* — Katherine W Mitchell
*Assistant Examiner* — Johnnie A. Shablack
(74) *Attorney, Agent, or Firm* — Piedmont Intellectual Property

(57) ABSTRACT

A thermally insulating curtain for windows and rooms provided with glass or transparent material. The curtain has an outer solar-energy-absorbing surface outside a thermally insulating layer. A space is disposed between the solar-energy-absorbing surface and a transparent layer situated outside the solar-energy-absorbing layer and/or between the solar-energy-absorbing surface and the thermally insulating layer. The curtain includes a structure that transports air through the space, and a fastener for arranging the curtain on the inside of a window, so that absorbed solar energy is supplied to the room behind the curtain.

10 Claims, 5 Drawing Sheets

Figure 1:
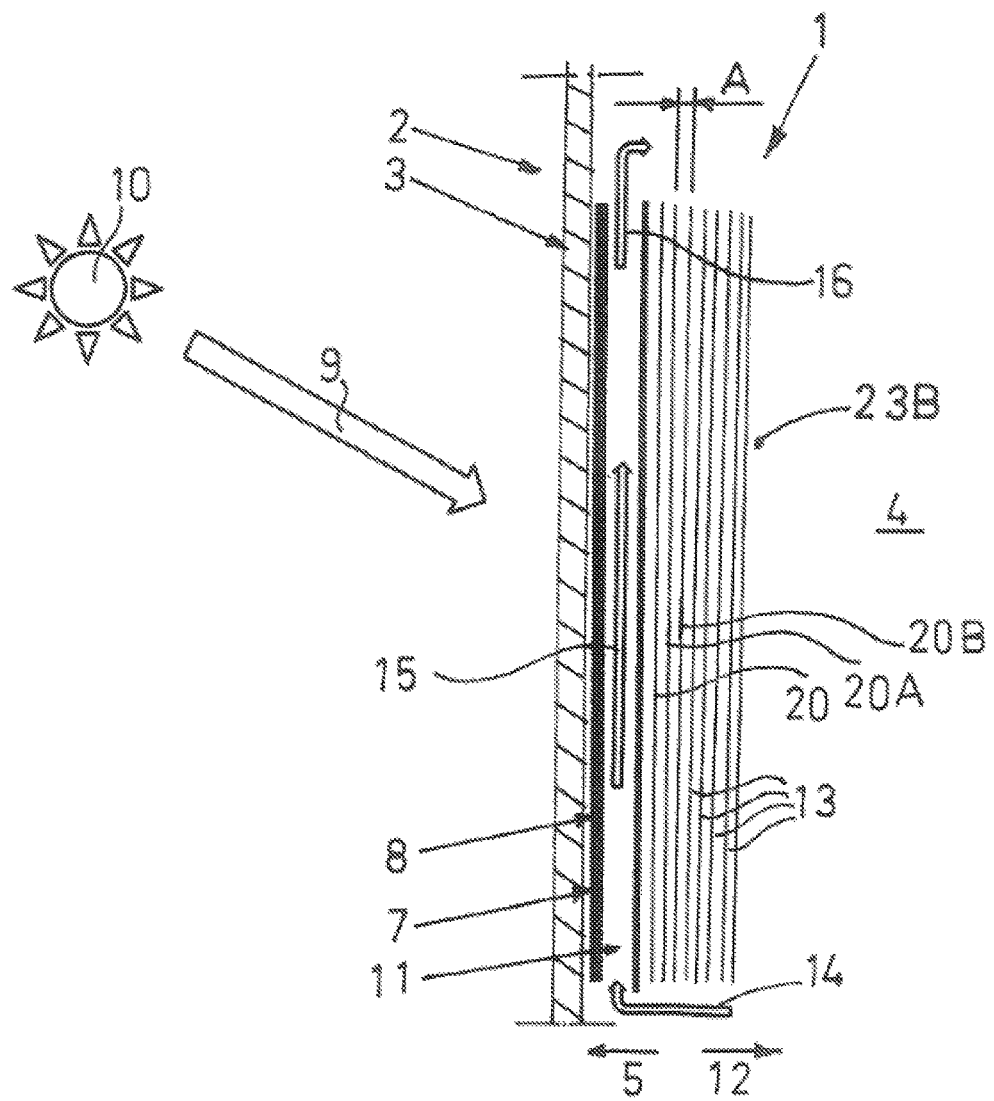

(51) Int. Cl.
*B60J 1/20* (2006.01)
*F24S 80/60* (2018.01)
*F24S 20/66* (2018.01)

(52) U.S. Cl.
CPC .............. *F24S 20/66* (2018.05); *F24S 80/60* (2018.05); *E06B 2009/2447* (2013.01); *Y02B 10/20* (2013.01); *Y02E 10/44* (2013.01)

(58) Field of Classification Search
USPC ........................................................ 126/624
See application file for complete search history.

(56) References Cited

U.S. PATENT DOCUMENTS

| | | | | |
|---|---|---|---|---|
| 2,595,905 | A * | 5/1952 | Telkes | F24J 2/16 126/400 |
| 3,288,206 | A * | 11/1966 | Beeler | G05D 23/192 165/299 |
| 3,903,665 | A * | 9/1975 | Harrison | E06B 3/6722 52/1 |
| 3,990,635 | A | 11/1976 | Restle et al. | |
| 3,996,919 | A * | 12/1976 | Hepp | F24J 2/04 126/400 |
| 4,002,159 | A * | 1/1977 | Angilletta | E06B 9/264 126/600 |
| 4,020,826 | A * | 5/1977 | Mole | A47H 23/02 126/628 |
| 4,037,639 | A * | 7/1977 | Jones | E06B 9/11 160/133 |
| 4,039,019 | A * | 8/1977 | Hopper | E04B 1/7612 160/121.1 |
| 4,046,133 | A * | 9/1977 | Cook | F24J 2/0444 126/632 |
| 4,068,652 | A * | 1/1978 | Worthington | F24F 5/0046 126/603 |
| 4,127,102 | A * | 11/1978 | Berman | F24J 2/20 126/583 |
| RE30,136 | E * | 11/1979 | Schriefer | F24J 2/28 126/648 |
| 4,194,550 | A | 3/1980 | Hopper | |
| 4,228,787 | A * | 10/1980 | Steinemann | E04B 1/7612 126/632 |
| 4,237,865 | A * | 12/1980 | Lorenz | E04B 1/74 126/599 |
| 4,265,222 | A * | 5/1981 | Kapany | F24D 11/007 126/595 |
| 4,275,645 | A * | 6/1981 | Ruff | A47F 3/0469 160/120 |
| 4,294,229 | A * | 10/1981 | Maloney | F24D 11/007 126/572 |
| 4,296,734 | A * | 10/1981 | Nevins | F24J 2/0433 126/628 |
| 4,300,532 | A * | 11/1981 | Olsen | F24J 2/0483 126/620 |
| 4,301,787 | A * | 11/1981 | Rice | F24J 2/0433 126/629 |
| 4,304,174 | A * | 12/1981 | Hickson | A47H 23/06 160/126 |
| 4,304,220 | A * | 12/1981 | Brockhaus | F24J 2/10 126/591 |
| 4,323,054 | A * | 4/1982 | Hummel | F24J 2/0444 126/623 |
| 4,327,795 | A * | 5/1982 | Wheeler | E06B 3/28 126/629 |
| 4,338,917 | A * | 7/1982 | Keller | F24J 2/00 126/630 |
| 4,344,473 | A * | 8/1982 | Shore | E06B 9/24 160/121.1 |
| 4,344,474 | A * | 8/1982 | Berman | E06B 9/40 160/121.1 |
| 4,347,835 | A * | 9/1982 | Seemann | E06B 3/6722 126/573 |
| 4,351,320 | A * | 9/1982 | Tetirick | F24J 2/0433 126/607 |
| 4,359,079 | A * | 11/1982 | Bledsoe | E06B 9/40 160/121.1 |
| 4,369,766 | A * | 1/1983 | Coley | F24J 2/0433 126/572 |
| 4,378,786 | A * | 4/1983 | Comeau, Jr. | F24J 2/22 126/631 |
| 4,379,449 | A * | 4/1983 | Wiggins | F24D 5/005 126/631 |
| 4,382,436 | A * | 5/1983 | Hager | E06B 7/02 126/572 |
| 4,408,650 | A * | 10/1983 | Verch | E06B 9/24 160/121.1 |
| 4,416,255 | A * | 11/1983 | Secamiglio | F24J 2/0488 126/631 |
| 4,433,712 | A * | 2/1984 | Mellon | A47H 99/00 160/122 |
| 4,436,084 | A * | 3/1984 | Carlston | F24J 2/0433 126/583 |
| 4,442,827 | A * | 4/1984 | Heiman | F24J 2/0433 126/600 |
| 4,467,788 | A * | 8/1984 | Peranio | F24J 2/02 126/636 |
| 4,469,087 | A * | 9/1984 | Cameron | F24J 2/0444 126/599 |
| 4,471,758 | A * | 9/1984 | Jennings | F24J 2/0444 126/591 |
| 4,506,720 | A * | 3/1985 | Iwanicki | E06B 9/24 160/121.1 |
| 4,510,921 | A * | 4/1985 | Yano | F24J 2/34 126/400 |
| 4,534,335 | A * | 8/1985 | Rice | F24J 2/0433 126/631 |
| 4,537,040 | A * | 8/1985 | Ibrahim | A47F 3/0469 160/1 |
| 4,615,381 | A * | 10/1986 | Maloney | F24J 2/0444 126/569 |
| 4,649,901 | A * | 3/1987 | Kelly | F24J 2/0433 126/629 |
| 4,655,195 | A * | 4/1987 | Boynton | E06B 9/365 126/631 |
| 4,679,406 | A * | 7/1987 | Weiblen | E06B 1/02 126/633 |
| 4,679,609 | A * | 7/1987 | Bateman | A47H 5/032 160/124 |
| 4,706,649 | A * | 11/1987 | Hager | F21S 11/00 126/606 |
| 4,784,215 | A * | 11/1988 | Sing | A01G 9/225 126/625 |
| 4,971,028 | A * | 11/1990 | Fagan | F24J 2/0433 126/595 |
| 5,081,982 | A * | 1/1992 | MacKenzie | F24J 2/0433 126/629 |
| 5,379,824 | A * | 1/1995 | Carvalho | E06B 3/2605 160/44 |
| 5,678,622 | A * | 10/1997 | Asmussen | E06B 9/24 160/121.1 |
| 6,257,302 | B1 * | 7/2001 | Bednarczyk | F24J 2/0007 160/98 |
| 7,281,561 | B2 * | 10/2007 | Anderson | E06B 9/264 160/121.1 |
| 7,631,641 | B1 * | 12/2009 | Goldman | F24F 7/013 126/569 |
| 7,650,721 | B2 * | 1/2010 | Nevins | F24J 2/0433 126/569 |
| 7,708,007 | B2 * | 5/2010 | Kim | F24C 15/006 110/175 R |
| 7,938,162 | B2 * | 5/2011 | Duineveld | E06B 9/64 160/121.1 |
| 8,191,547 | B2 * | 6/2012 | Pellegrino | F24J 2/0433 126/624 |
| 8,573,195 | B2 * | 11/2013 | Tinoco Cavalheiro | E06B 3/6722 126/583 |

(56) References Cited

U.S. PATENT DOCUMENTS

| | | | | |
|---|---|---|---|---|
| 8,640,690 B2* | 2/2014 | McKinzie | | F24J 2/0007 |
| | | | | 126/628 |
| 8,863,741 B2* | 10/2014 | MacKay | | F24J 2/05 |
| | | | | 126/600 |
| 9,673,346 B1* | 6/2017 | Martin | | H01L 31/058 |
| 2005/0133019 A1* | 6/2005 | Kim | | F24C 15/04 |
| | | | | 126/198 |
| 2006/0076008 A1* | 4/2006 | Kerr | | F24J 2/0433 |
| | | | | 126/638 |
| 2008/0053628 A1* | 3/2008 | Anderson | | E06B 9/264 |
| | | | | 160/238 |
| 2010/0186734 A1* | 7/2010 | Arndt | | F24F 5/0075 |
| | | | | 126/629 |
| 2010/0288265 A1* | 11/2010 | Madsen | | F24J 2/0444 |
| | | | | 126/599 |
| 2010/0294260 A1* | 11/2010 | Chow | | E06B 3/6722 |
| | | | | 126/643 |
| 2011/0139147 A1 | 6/2011 | Grulke | | |
| 2012/0090599 A1* | 4/2012 | Parana | | F24J 2/0433 |
| | | | | 126/638 |
| 2012/0318465 A1* | 12/2012 | Colson | | E06B 9/262 |
| | | | | 160/7 |
| 2015/0129140 A1* | 5/2015 | Dean | | E06B 9/24 |
| | | | | 160/5 |
| 2016/0153228 A1* | 6/2016 | Hertz | | B60J 1/2041 |
| | | | | 160/181 |

FOREIGN PATENT DOCUMENTS

| | | | | |
|---|---|---|---|---|
| WO | WO 9829697 A1 * | 7/1998 | | F24F 12/006 |
| WO | 2004009946 A1 | 1/2004 | | |

\* cited by examiner

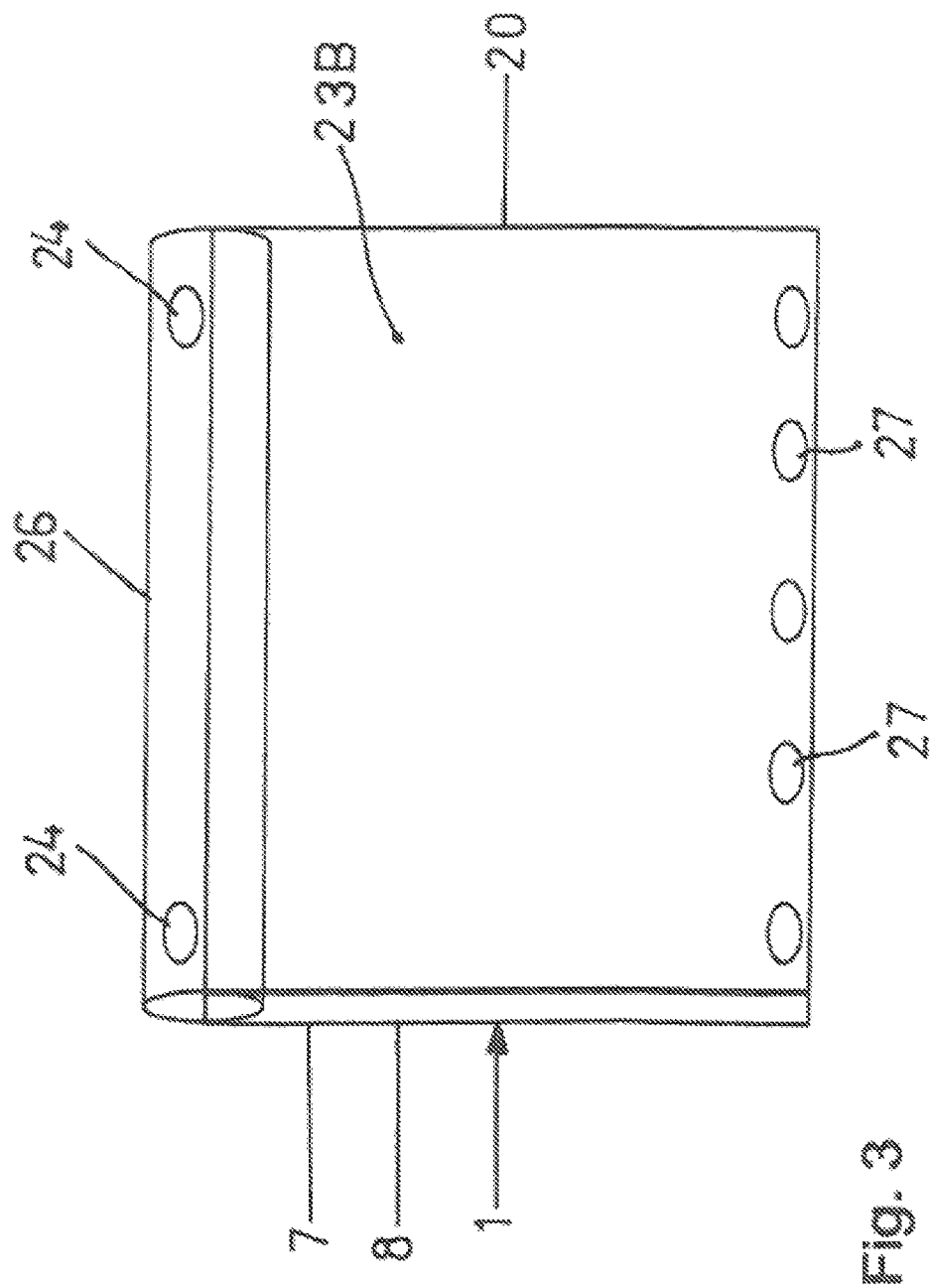

THERMALLY INSULATING CURTAIN

The present invention concerns a thermally insulating curtain for windows and other rooms, etc. provided with glass.

It is previously known to insulate and protect against heat produced hot days by the sun in buildings and other spaces. Examples of this may be studied in U.S. Pat. No. 4,194,550A. However, this known curtain only solves the above mentioned problems. In, e.g., secondary residences, empty premises, campers, caravans, boats, which are not utilized large parts of the year, there is a need for at least maintaining a certain temperature in said spaces to avoid damage to fixtures and objects stored therein. It is, e.g., possible to utilise electric heating, which becomes expensive, or other means therefor. For instance, there is an apparatus which is externally mounted on, e.g., storages and which takes advantage of the sun's energy, which is brought into the building via a conduit therefor. However, if there are windows on the building, large parts of the introduced heat quickly dissipate out again via the glass of the windows. There are also heat pumps as source of energy, but these require large investments in purchasing and mounting.

Therefore, the main object of the present invention is primarily to provide an efficient and cost-saving solution, which takes advantage of the sun's energy those days when it is out and shining on windows and in that connection conveys the solar heat obtained into the building in question, in particular autumn, winter, and spring seasons when, e.g., the house is not utilized. At all events on weekdays when no one resides therein, and it is desired to provide a certain maintenance heat therein but simultaneously also be able to retain the heat in the house as long a period of time as possible without the same quickly dissipating out through the windows of the building via its glass panes.

Said object is achieved by means of a curtain according to the present invention, which essentially is characterized in that the curtain has an outer dark, for instance black, solar energy absorbing surface outside a technical insulating layer, that a space is formed between said black surface and a transparent layer situated outside the black solar energy absorbing surface and/or between said black solar energy absorbing surface and the thermally insulating layer of said curtain situated inside the same, that there is means that allows transportation of air through said space of the curtain, the curtain having fastening members to make possible curtain arrangement on the inside of the window in question, so that absorbed solar energy is supplied to the room, etc. behind the curtain.

Figure 2A:
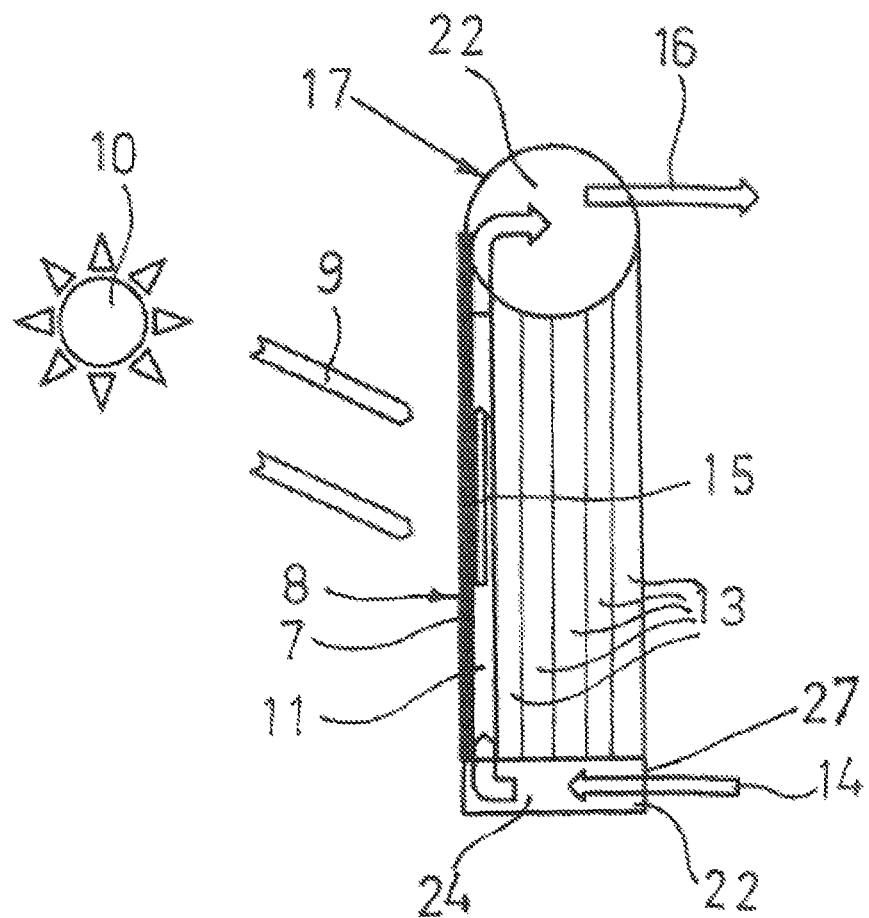
Figure 2B:
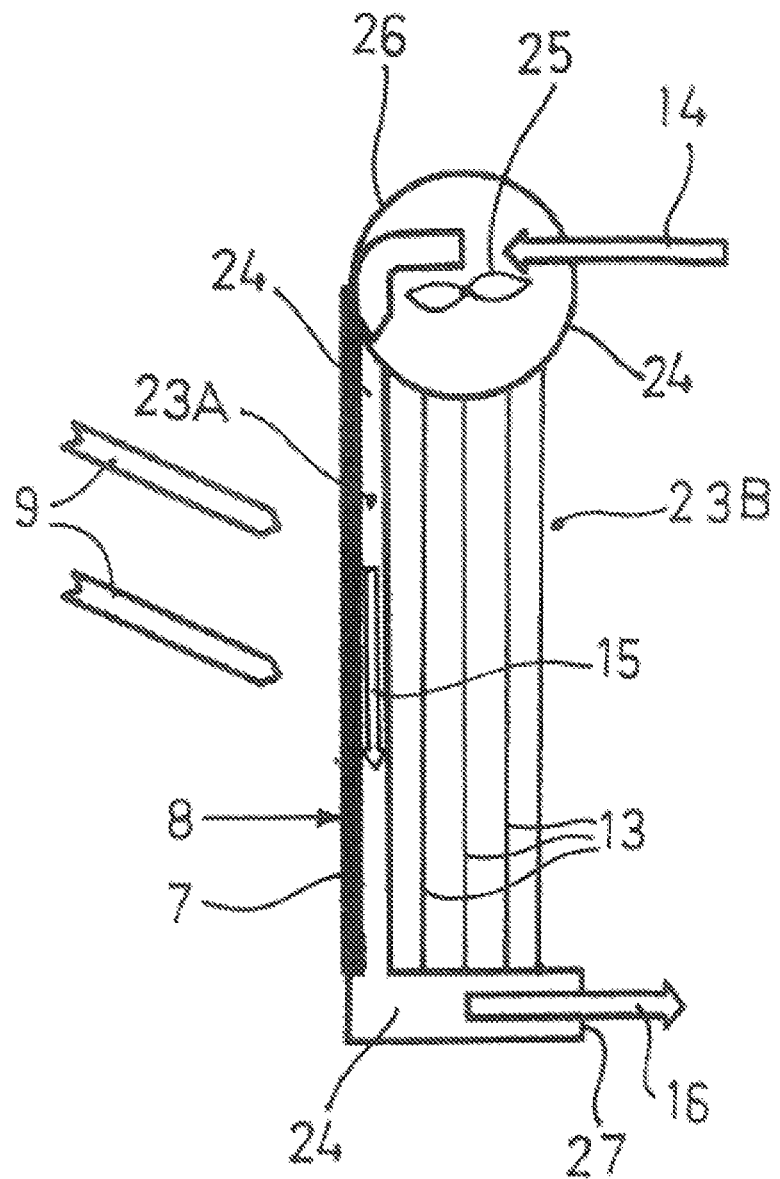
Figure 2C:
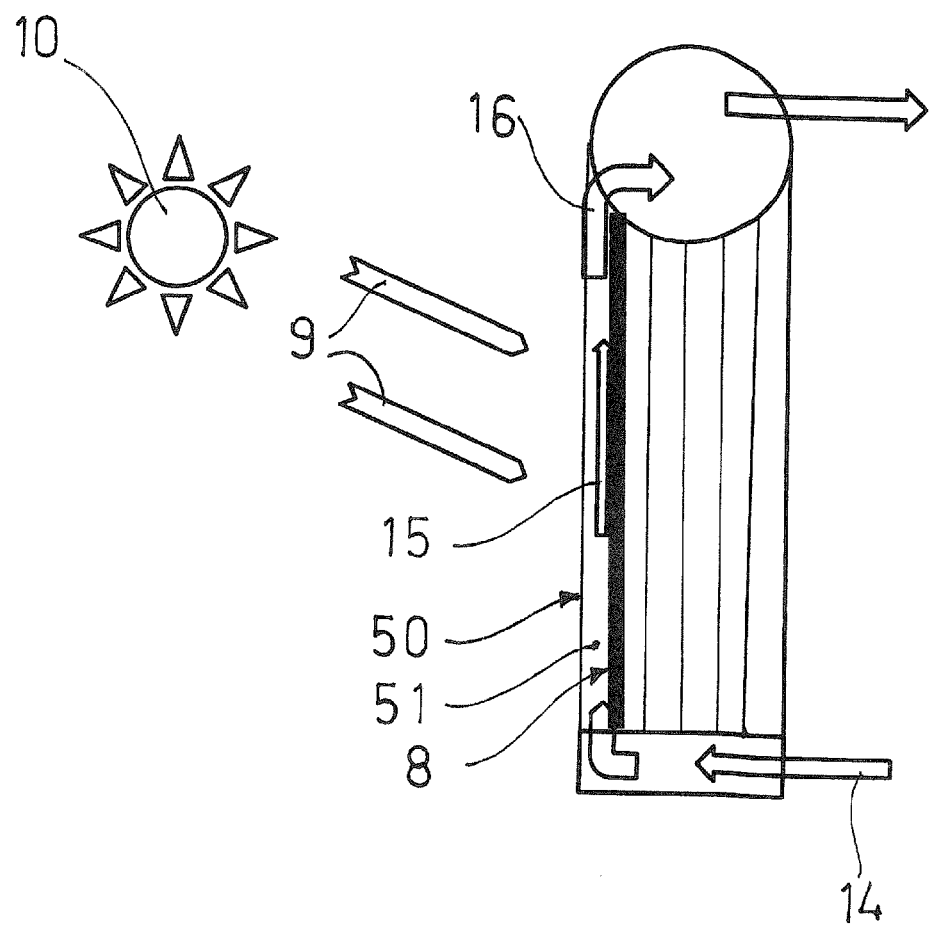

The invention is described below in the form of a number of proposed embodiments, reference being made to the accompanying drawings, in which, FIG. 1 schematically shows a cross-sectional view of a curtain according to the invention and when the sun is shining on the curtain in a window, FIGS. 2A and 2B show examples of a curtain and with different air changes, FIG. 2C show an example of another preferred embodiment example of a curtain according to the invention, and FIG. 3 schematically shows a curtain with shown air passage openings.

A curtain 1 arranged thermally insulating according to the present invention, which is arranged and intended to be utilized in holiday houses, campers, caravans, boats, and other similar rooms 4, which are not utilized every day long periods of time cold and moist days, for windows 2 and other rooms 4 provided with glass 3, has an outer layer 7, which faces outward 5 toward the pane 3 of a window and which is provided with a solar energy absorbing external black surface 8, which is arranged and intended to be heated up by the solar radiation 9 from the sun 10. Furthermore, said thermally insulating curtain 1 is arranged so that a space 11 is formed between said black surface 8 and a thermally insulating layer 13 of said curtain 1 situated inward 12 toward the room 4. There is means 25 that allows transportation of air 14, 15, 16 through said space 11 of the curtain 1, from said room, etc. 4 and back to said room, etc. 4. For curtain arrangement at the top or beside a window 2, the curtain 1 has suitable fastening member/members 17 on the inside of a window 2 in question, so that stored absorbed solar energy is supplied to the room, etc. 4, which is situated behind the curtain in the window 2, the curtain 1 having a suspension rod 26 disposed at a top of the curtain 1. The suspension rod 26 has an outlet opening 24 for air, and outlet openings 27 at a bottom of the curtain 1 for air through the curtain.

Said curtain 1 may consist of one or more layers 13 having insulating air gaps 20, 20A, 20B . . . made between the same or at least between the outer layer 7 of the curtain and an insulating layer 20. In that connection, the thermally insulating layer 13 is formed of a plurality of textiles, sheets, or the like air partitions—e.g., of textile or of another material that is foldable and rollable and not so stiff and rigid—held at a mutual distance A from each other and extending parallel to the layer 7 having said black solar energy absorbing surface 8. The thermally insulated space 11 made between the black solar energy absorbing surface 8 and an externally situated surface of the insulating layer 13 facing said space 11 is open all the way through preferably from bottom to top or from top to bottom. At the bottom and/or top, the curtain 1 has a transverse air duct 22, which extends from said externally situated black solar energy absorbing surface 8 inward toward intended room, etc. 4. In that connection, a fan 25, which is driven by electricity, solar cells and/or battery, may be arranged to transport air in said air space 11. By means of said fans or by convection, the heated air behind the matt black surface 8 is brought to flow past and thereby transport the heated air out to said room 4 therein.

In the embodiment having fans, for example in the form of a number of fans that are controlled by a differential thermostat 23A, 23B, the fans are running when the space 11 behind the solar collector surface 7 is warmer than the room 4. If the temperature is the same or if it is colder in the solar collector, the fans are idle.

The curtain 1 has preferably a circumference shape and width fitting to the opening and depth of the intended window, and fastening member for the suspension of the curtain may consist of a roller-blind rod or another similar rotatable windable part and which preferably has a through air duct.

The curtain 1 is preferably formed of flexible textile layers 20, 20A, 20B held at a mutual distance A from each other, as seen in the depth direction of a window in question with formed spaces 13 between said layers. In doing so, air is arranged to flow, by fan action or by convection, through said space 11 from bottom to top or vise versa to be extracted from an intended room 4 in an intended building, premises, boat, or intended vehicle for heating by the sun's beams.

Preferred embodiment example of a curtain shown in FIG. 2C differs only from the embodiment examples of curtain described above in that a transparent layer 50 of, for instance, plastic foil or another plastic material is situated outermost of said curtain facing toward an intended pane in the usage stage of the curtain.

In other respects, said curtain is similar to the curtain described above.

Air 14 is now conveyed in the formed space 51 between the external dark surface 8 absorbing solar energy and said transparent layer 50 in the desired direction as according to above-mentioned.

Variant of the curtain is that both embodiments are arranged to work as alternative or simultaneously, i.e., air is conveyed in the space 51 and/or in the space 11 as mentioned.

The nature of the curtain 1 should have been explained by the above. The function of the invention is briefly according to the following:

The curtain 1 is primarily intended for premises and houses or rooms 4 that for the moment are not used, or where the window is not needed for light or view.

By letting the curtain 1 be thick and arrange so that it consists of a plurality of insulating layers, a low U-value is achieved, and when the curtain is rolled up, the layers are brought together and the curtain becomes thin and easy to roll up. Of course, it can be folded together should it be more convenient.

When the sun 10 is shining against the surface 8 of the curtain, it, or at least a part of the same, becomes hot. This heat is transported out into the room 4 and contributes to the heating. Said solar heat would also have come into the room if the curtain had not been there, but then there would have been the energy losses through the window. Thus, the curtain works as a non-return valve for the heat, i.e., let in, but not let out, the heat.

Naturally, the invention is not limited to the embodiments described above and shown in the accompanying drawings. Modifications are feasible, particularly as for the nature of the different parts, or by using an equivalent technique, without departing from the protection area of the invention, such as it is defined in the claims.

The invention claimed is:

1. A thermally insulating curtain for a window of a room, comprising:
    an outer dark solar-energy-absorbing surface, wherein a first side of the outer dark solar-energy-absorbing surface faces an inner side of a windowpane;
    an inner thermally insulating layer that faces an opposite second side of the outer dark solar-energy-absorbing surface;
    a space that is at least one of situated between the first side of the outer solar-energy-absorbing surface and a transparent layer situated between the windowpane and first side of the outer dark solar-energy-absorbing surface or situated between the opposite second side of the outer solar-energy absorbing surface and the inner thermally insulating layer;
    an air transport structure configured to move air through the space;
    a fastener for arranging the thermally insulating curtain facing the inner side of the windowpane such that solar energy absorbed by the outer dark solar-energy-absorbing layer is transferred to air moved by the air transport structure through the space and supplied to the room;
    a fixed suspension rod disposed at a top of the curtain, the fixed suspension rod having an outlet opening for air moved by the air transport structure through the space; and
    outlet openings at a bottom of the curtain for air moved by the air transport structure through the space;
    wherein the inner thermally insulating layer comprises a plurality of air partitions mutually disposed at a distance from each other and extending parallel to the outer solar-energy-absorbing surface; each air partition individually sharing air with the room; and the transparent layer is flexible.

2. The curtain of claim 1, wherein the curtain has a cross-sectional shape and a width fitted to an opening and depth of the window.

3. The curtain of claim 1, wherein the transparent layer is plastic material.

4. The curtain of claim 1, wherein the fastener comprises a rotatable part.

5. The curtain of claim 4, wherein the rotatable part has a through air duct.

6. The curtain of claim 1, wherein the space is unobstructed and includes a thermostat that determines air temperature in at least one of the space and the room and a valve that prevents cold air from being conveyed into the room by cold downdraft.

7. The curtain of claim 6, further comprising a transverse air duct that is disposed at at least one of a bottom and a top of the curtain and that extends from the outer solar-energy-absorbing surface inward toward the room.

8. The curtain of claim 7, wherein the air transport structure comprises an electrically powered fan, and the thermostat determines air temperature in the air space and in the room.

9. The curtain of claim 8, wherein the inner thermally insulating layer comprises flexible layers mutually disposed at a distance from each other.

10. The curtain of claim 7, wherein the air transport structure produces convective air flow through the space from the bottom to the top.

* * * * *